Patented July 7, 1942

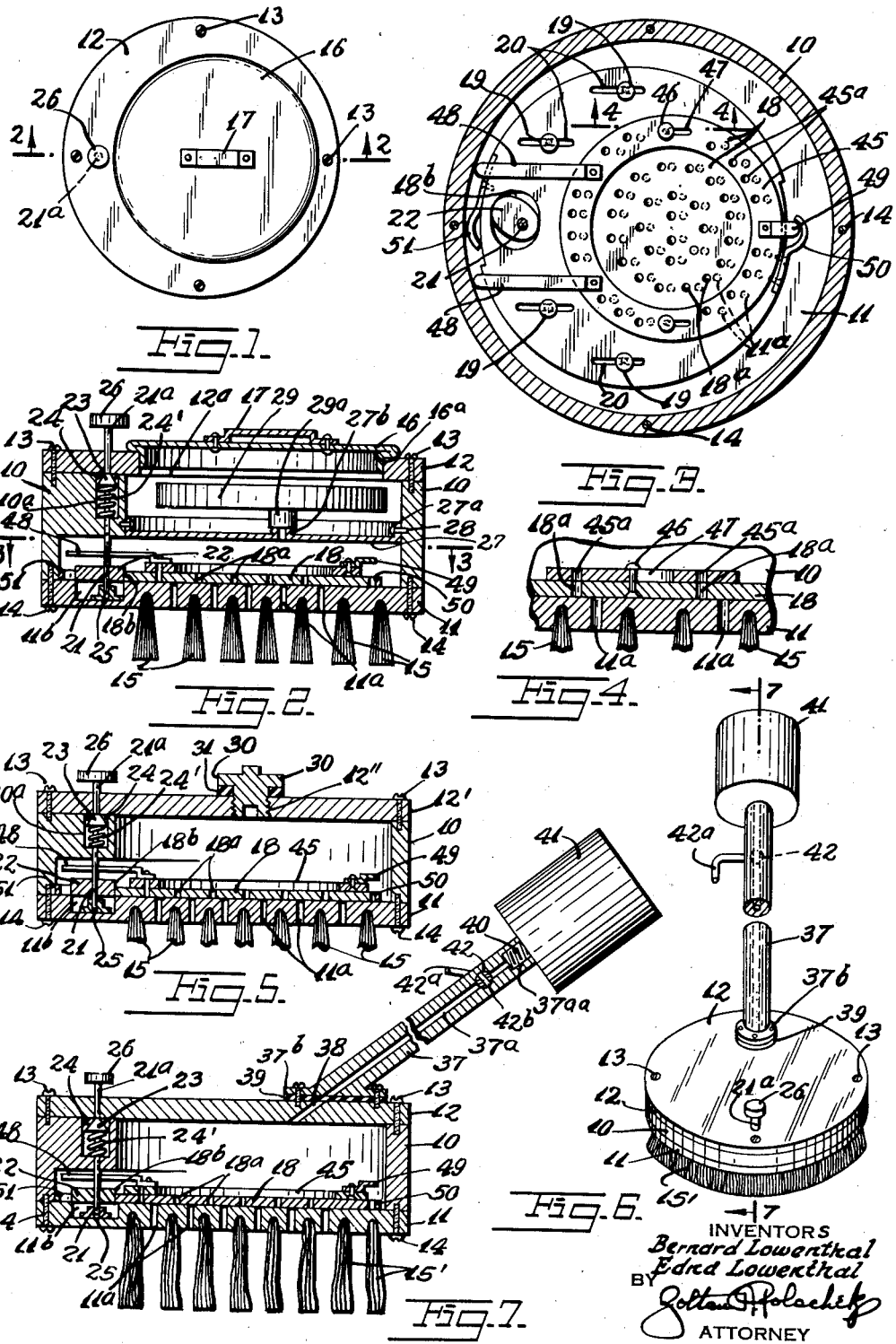

2,289,026

UNITED STATES PATENT OFFICE 2,289,026

RESERVOIR BRUSH

Bernard Lowenthal and Edna Lowenthal,
New York, N. Y.

Application February 25, 1941, Serial No. 380,468

7 Claims. (Cl. 137—21)

This application is a continuation-in-part of our application Serial No. 242,172, filed November 25, 1938.

This invention relates to new and useful improvements in a reservoir brush.

More specifically, the invention proposes the construction of a reservoir brush characterized by the provision of a hollow body having a bottom perforated wall and another wall formed with an opening through which a fluid may be supplied to the interior of said body so as to be capable of passing through said perforations for saturating the bristles mounted upon the outer face of said bottom wall and between said perforations.

Still further the invention proposes the provision of a perforated shutter slidably mounted within said body for covering the perforations in said bottom wall and movable in a manner to align its perforations with the perforations of said bottom wall for permitting the liquid to pass therethrough in the aligned position and for limiting the liquid from passing therethrough in a disaligned position.

The invention has for another object the association of a member with the shutter for blocking off certain of said perforations when desired and movable to an inoperative position when desired.

Still further the invention contemplates an arrangement whereby the member mentioned in the previous paragraph may be moved by means controlled exteriorly of the reservoir brush.

A novel arrangement is also proposed for opening up said reservoir brush and making said shutter and said member accessible.

Another object of this invention is the provision of a novel means for moving said shutter from the outside in said body for causing the aligning and disaligning of said perforations for controlling the passage of liquid therethrough.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure—

Fig. 1 is a plan view of a reservoir brush constructed according to this invention.

Fig. 2 is a vertical sectional enlarged view taken on the line 2—2 of Fig. 1.

Fig. 3 is a horizontal sectional view on the line 3—3 of Fig. 2.

Fig. 4 is a vertical sectional enlarged view taken on the line 4—4 of Fig. 3.

Fig. 5 is a view similar to Fig. 2 but illustrating a modification of the invention.

Fig. 6 is a perspective view of still another modification of the invention.

Fig. 7 is a vertical sectional view taken on the line 7—7 of Fig. 6.

The reservoir brush, according to this invention, includes a hollow body 10 of cylindrical form having a bottom wall 11 and a top wall 12. The top wall 12 is maintained in position by means of a plurality of screws 13 and is formed with an opening 12$^a$ through which a liquid may be supplied to the interior of the hollow body 10. The bottom wall 11 is likewise held in position by means of a plurality of screws 14 and is provided with a plurality of perforations 11$^a$ which extend therethrough and connect the interior of said body with the bottom of the bottom wall 11. A plurality of bristles 15 is mounted upon the bottom face of the bottom wall 11 and between the perforations 11$^a$ and the liquid passing from the hollow body is adapted to saturate the bristles.

Means is provided for closing the opening 12$^a$ and consists of a cover 16 having a depending skirt portion 16$^a$ which is adapted to be engaged into the opening 12$^a$ for holding the cover in position thereon. The cover 16 is provided with a handle 17 which is adapted to be manually grasped and pulled for removing the cover 16 from the top wall 12.

A perforated shutter 18 is mounted within the hollow body 10 and upon the inner face of the bottom wall 11. The shutter 18 is formed with a plurality of perforations 18$^a$ which are adapted to be aligned and disaligned with the perforations 11$^a$ for controlling the passage of fluid from the hollow body 10. The shutter 18 is adjustably supported upon the inner face of the bottom wall 11 by means of a plurality of pins 19 which extend from the inner face of the bottom wall 11 and which pass through elongated slots 20 formed in the shutter 18. The slots 20 are of lengths greater than that required to limit movement of the shutter 18 to positions in which the perforations 11$^a$ and 18$^a$ will be aligned or disaligned.

Means is provided for moving the shutter 18 to align its perforations 18$^a$ with the perforations 11$^a$, and which is manually operable from the exterior of the hollow body 10. This means comprises a stem 21 turnably mounted in the body 10 at right angles to the shutter 18 and which has an end 21$^a$ projecting through the top wall 12. A cam 22 is mounted on the stem 21 and engages a cam opening 18$^b$ formed in the shutter 18. The cam 22 is eccentrically mounted upon the stem 21 so that when the stem 21 is turned through substantially 120°, the shutter 18 will be moved from a position in which the perforations 11$^a$ and 18$^a$ are disaligned to a position in which the perforations 11$^a$ and 18$^a$ will be aligned and vice versa.

A member 45 is mounted on the shutter 18 and is for the purpose of blocking off certain of the perforations 18ª when desired and is movable to an inoperative position. More particularly, the member 45 is in the form of a flat annular shaped part. It is slidably mounted on the shutter 18 by several headed elements 46 mounted on the shutter 18 and extending through slots 47 formed in the member 45. The headed elements 46 set up enough friction in conjunction with the material of the member 45 adjacent the slots 47 so that the member 45 is frictionally held in a fixed position relative to the shutter 18. The member 45 is formed with a plurality of openings 45ª which normally are in alignment with a complementary group of openings of said openings 18ª formed in the shutter 18. However, the member 45 may be moved so as not to align the openings 45ª with the said openings 18ª.

Means is provided for moving the member 45 relative to the shutter 18. This means includes a pair of fingers 48 mounted on the member 45 and projecting towards a side wall of the body 10. These fingers 48 are arranged to extend along opposite sides of the stem 21. Another finger 49 is mounted on the member 45 diametrically opposite the center point of said fingers 48. This finger 49 is directed towards the adjacent area of the wall of the body 10. A leaf spring 50 is mounted on the side of the shutter 18 immediately adjacent the finger 49 and normally extends slightly outwards of the fingers. Another spring 51 is mounted on the shutter 18 in the vicinity of the fingers 48 and normally extends slightly outwards of the tip ends of the fingers 48.

The springs 50 and 51 act normally as stops for limiting the amplitude of motion of the shutter 18. The stem 21 may be turned for operating the cam 22 so that the shutter 18 is moved in one direction, for example, towards the left as illustrated in Fig. 3 until the spring 51 strikes the side of the body 10. Then the perforations 18ª and 11ª are out of alignment with each other. The stem 21 may be moved to move the cam 22 in the other direction so that shutter 18 moves towards the right until the spring 50 strikes the body 10 and then the perforations 18ª are perfectly aligned with the perforations 11ª. It is possible to move the stem 21ª so that the cam 22 moves the shutter 18 to intermediate positions so as to partially align the perforations 18ª with the perforations 11ª.

The perforations 45ª of the member 45 may be moved out of alignment with the perforations 18ª by turning the stem 21 so as to cause the cam 22 to move the shutter 18 towards the right, as illustrated in Fig. 3, to an extreme position in which the spring 50 will be compressed. When this happens the fingers 49 strike the body 10 and move the member 45 towards the left relative to the shutter 18. When the spring 50 is tautly compressed the perforations 45ª will be out of alignment with the said certain perforations 18ª. These perforations 45ª may be moved back into alignment by turning the stem 21 so that the cam 22 moves the shutter 18 to the extreme left, as illustrated in Fig. 3. During this motion the spring 51 will be compressed so that the finger 49 strikes the body 10 and the member 45 is moved towards the right in relation to the shutter 18.

Means is provided for holding the stem 21 in fixed positions for preventing the shutter 18 from accidentally moving except when the stem 21 is manually turned. This means includes a conical shaped member 23 which is mounted on the stem 21 intermediate of its ends and within an enlarged opening 10ª formed in one side of the hollow body 10. A friction member 24 is mounted within the top end of the enlarged opening 10ª and is formed with a conical shaped opening into which the conical shaped member 23 is adapted to be urged for frictionally maintaining the stem 21 in its adjusted positions. A spring 24′ is coaxially mounted upon the stem 21 and operates between the bottom wall and the opening 10ª and the bottom face of the conical shaped member 23 for urging the stem 21 upwards into a position in which the conical shaped member will engage the friction element 24. The bottom end of the stem 21 is rotatively and slidably supported in a bearing 25 mounted within an enlarged opening 11ᵇ formed in the bottom wall 11 for permitting the stem 21 to be manually urged inwards against the action of the spring 24′ to disengage the conical shaped member 23 from the friction element 24 to permit the stem 21 to be manually turned to operate a cam 22 and adjust the position of the shutter 18.

The projected end 21ª of the stem 21 is formed with an enlarged head 26 which is adapted to be manually grasped for facilitating the movement of the shaft 21 and the turning thereof for the purpose of aligning and disaligning the perforations 11ª and 18ª.

The hollow body 10 is formed with a horizontal intermediate wall 27 having its edge portions 27ª bent upwards and through which fastening elements 28 are engaged for maintaining the wall 27 in position within the body 10. The intermediate wall 27 is formed with an upwardly extending neck opening 27ᵇ. A container 29 containing the fluid to be used for saturating the bristles 15 is adapted to be passed into the upper half of the hollow body 10 when the cover 16 is removed therefrom. The container 29 is formed with a neck 29ª which is adapted to be threadedly engaged upon the neck 27ᵇ for permitting the liquid to pass from the container 29 through the necks 27ᵇ and 29ª and into the bottom portion of the hollow body 10.

The operation of this form of the invention is as follows: For filling the hollow body 10, the stem 21 is manually urged inwards and rotated to move the shutter 18 to a position in which the perforations 11ª and 18ª are disaligned. The cover 16 is then removed from the opening 12ª in the top wall 12 and the container 29 is passed into the hollow body 10 and its neck 29ª threadedly engaged on the neck 27ᵇ of the intermediate wall 27. It is necessary that the reservoir brush be inverted while the container 29 is being engaged into the hollow body 10 for preventing the liquid from spilling upon the intermediate wall 27.

The cover 16 is then replaced upon the top wall 12 and the brush is ready for use. For saturating the bristles with the liquid within the hollow body the stem 21 is manually urged inwards by pressing upon the head 26 to cause the conical shaped member 23 to be disengaged from the friction element 24 and the stem 21 is rotated while in its depressed condition for causing the cam 22 to move the shutter 18 to a position in which the perforations 11ª and 18ª are aligned for permitting the liquid to pass through the perforations and on to the bristles 15. After the bristles are saturated to the desired degree the perforations 11ª and 18ª are again disaligned by moving the shutter 18 in the desired direction by using the stem 21.

During the initial application of liquid to the bristles 15, it is advisable that the perforations 45a and certain of the perforations 18a be in alignment with each other. This causes the liquid to pass through all of the perforations 18a and the aligned perforations 11a to quickly saturate all of the bristles 15. However, after this initial saturation it is advisable that the perforations 45a be moved out of alignment with said certain perforations 18a. Then the discharge of the liquid will be limited to the central area of bristles 15. This arrangement prevents too much of the liquid from reaching the outer area of bristles 15 and causing too much discharge of the liquid.

According to the modification of the invention shown in Fig. 5 the construction of the reservoir brush is similar to that previously described except that the hollow body 10 is not formed with the intermediate wall 27. The top wall 12' is formed with a reduced opening 12" through which the fluid may pass for filling the interior of the hollow body 10. A plug 30 is adapted to be threadedly engaged into the opening 12" and a rubber gasket 31 is mounted on the plug 30 and is adapted to be clamped between the adjacent faces of the top wall 12' and an outwardly extending flange 30a of the plug 30 for preventing the liquid from leaking through the top wall 12'. In other respects this form of the invention is similar to the previous form.

According to the modification shown in Figs. 6 and 7 the hollow body 10 is in the form of a reservoir mop having a plurality of cords 15' mounted upon the bottom face of the bottom wall 11 for forming the mopping surface thereof. An elongated handle 37 has one of its ends attached to the top face of the top wall 12 and is provided with a passage 37a which extends completely therethrough and which is connected with the interior of the hollow body 10 by means of an opening 38 which extends through the top wall 12.

From a careful inspection of Fig. 7 it will be noted that the openings 37a and 38 are in end alignment with each other. The bottom end of the handle 37 is formed with an outwardly extending flange 37b and a rubber gasket 39 is mounted between the adjacent faces of the bottom end of the handle 37 and the top face of the top wall 12 for preventing the leakage of liquid therethrough. The upper end of the handle 37 is formed with an enlarged opening 37aa which continues from the opening 37a and to which the neck 40 of a container 41 is adapted to be engaged. The container 41 is adapted to be filled with an oil or other fluid commonly used for saturating the cords 15' which are mounted upon the bottom wall 11.

A valve is provided in the handle 37 for controlling the passage of the liquid from the container 41 to the interior of the hollow body 10. This valve is in the form of a ball 42 mounted within an enlarged portion of the opening 37a and which has a handle 42a extending to the exterior of the handle by which the ball may be turned. The ball 42 is formed with a passageway 42b which extends therethrough and which is adapted to be aligned with the passage 37a for permitting the fluid to pass therethrough. In other respects this form of the invention is similar to the previous forms.

It is to be understood that this device may be used in homes, factories, on railways, ships, and in connection with army and navy equipments, also for cleaning and lubricating gun barrels of all calibres.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new and desire to secure by United States Letters Patent is:

1. In a device of the class described, a hollow body having an open bottom and adapted to contain a liquid, a removable wall for closing said open bottom, a rotative shaft within said hollow body and having an end extended through the top of said body and provided with a handle, a cam mounted on said shaft within said hollow body, releasable means within said container for restraining said shaft against easy turning, said removable wall having a plurality of openings through which said liquid is adapted to discharge, a shutter valve slidably mounted on the inside face of said removable wall for controlling the discharge of liquid through said openings, said shutter valve having an opening extended completely from the top to the bottom and into the top of which said cam extends for shifting said shutter valve as said shaft is turned, whereby said wall and shutter valve may be removed from said hollow body as a unit to expose the interior of said hollow body, and a member mounted on said shutter for blocking off certain of said perforations and movable to an inoperative position.

2. In a device of the class described, a hollow body having an open bottom and adapted to contain a liquid, a removable wall for closing said open bottom, a rotative shaft within said hollow body and having an end extended through the top of said body and provided with a handle, a cam mounted on said shaft within said hollow body, releasable means within said container for restraining said shaft against easy turning, said removable wall having a plurality of openings through which said liquid is adapted to discharge, a shutter valve slidably mounted on the inside face of said removable wall for controlling the discharge of liquid through said openings, said shutter valve having an opening extended completely from the top to the bottom and into the top of which said cam extends for shifting said shutter valve as said shaft is turned, whereby said wall and shutter valve may be removed from said hollow body as a unit to expose the interior of said hollow body, and a member mounted on said shutter for blocking off certain of said perforations and movable to an inoperative position, said member having perforations which in one position align with certain of the perforations of said shutter and which in its inoperative position are out of alignment with said perforations.

3. In a device of the class described, a hollow body having an open bottom and adapted to contain a liquid, a removable wall for closing said open bottom, a rotative shaft within said hollow body and having an end extended through the top of said body and provided with a handle, a cam mounted on said shaft within said hollow body, releasable means within said container for restraining said shaft against easy turning, said removable wall having a plurality of openings through which said liquid is adapted to discharge, a shutter valve slidably mounted on the inside face of said removable wall for controlling the discharge of liquid through said openings, said shutter valve having an opening extended completely from the top to the bottom and into the top of which said cam extends for shifting said shutter valve as said shaft is turned, whereby said wall and shutter valve may be removed from said hollow body as a unit to expose the interior of said hollow body, and a member mounted on said shutter for blocking off certain of said perforations and movable to an inoperative position, said member having perforations which in one position align with certain of the perforations of said shutter and which in its inoperative position are out of alignment with said perforations, said member being slidably mounted on said shutter.

4. In a device of the class described, a hollow body having an open bottom and adapted to contain a liquid, a removable wall for closing said open bottom, a rotative shaft within said hollow body and having an end extended through the top of said body and provided with a handle, a cam mounted on said shaft within said hollow body, releasable means within said container for restraining said shaft against easy turning, said removable wall having a plurality of openings through which said liquid is adapted to discharge, a shutter valve slidably mounted on the inside face of said removable wall for controlling the discharge of liquid through said openings, said shutter valve having an opening extended completely from the top to the bottom and into the top of which said cam extends for shifting said shutter valve as said shaft is turned, whereby said wall and shutter valve may be removed from said hollow body as a unit to expose the interior of said hollow body, and a member mounted on said shutter for blocking off certain of said perforations and movable to an inoperative position, said member having perforations which in one position align with certain of the perforations of said shutter and which in its inoperative position are out of alignment with said perforations, said member being slidably mounted on said shutter, and friction means for holding said member in fixed positions on said shutter.

5. In a device of the class described, a hollow body having an open bottom and adapted to contain a liquid, a removable wall for closing said open bottom, a rotative shaft within said hollow body and having an end extended through the top of said body and provided with a handle, a cam mounted on said shaft within said hollow body, releasable means within said container for restraining said shaft against easy turning, said removable wall having a plurality of openings through which said liquid is adapted to discharge, a shutter valve slidably mounted on the inside face of said removable wall for controlling the discharge of liquid through said openings, said shutter valve having an opening extended completely from the top to the bottom and into the top of which said cam extends for shifting said shutter valve as said shaft is turned, whereby said wall and shutter valve may be removed from said hollow body as a unit to expose the interior of said hollow body, and a member mounted on said shutter for blocking off certain of said perforations and movable to an inoperative position, said member having perforations which in one position align with certain of the perforations of said shutter and which in its inoperative position are out of alignment with said perforations, said member being slidably mounted on said shutter, and friction means for holding said member in fixed positions on said shutter, said member being of annular shape, said shutter valve having perforations alignable with said openings.

6. In a device of the class described, a hollow body having an open bottom and adapted to contain a liquid, a removable wall for closing said open bottom, a rotative shaft within said hollow body and having an end extended through the top of said body and provided with a handle, a cam mounted on said shaft within said hollow body, releasable means within said container for restraining said shaft against easy turning, said removable wall having a plurality of openings through which said liquid is adapted to discharge, a shutter valve slidably mounted on the inside face of said removable wall for controlling the discharge of liquid through said openings, said shutter valve having an opening extended completely from the top to the bottom and into the top of which said cam extends for shifting said shutter valve as said shaft is turned, whereby said wall and shutter valve may be removed from said hollow body as a unit to expose the interior of said hollow body, a member mounted on said shutter for blocking off certain of said perforations and means for moving said member relatively on said shutter.

7. In a device of the class described, a hollow body having an open bottom and adapted to contain a liquid, a removable wall for closing said open bottom, a rotative shaft within said hollow body and having an end extended through the top of said body and provided with a handle, a cam mounted on said shaft within said hollow body, releasable means within said container for restraining said shaft against easy turning, said removable wall having a plurality of openings through which said liquid is adapted to discharge, a shutter valve slidably mounted on the inside face of said removable wall for controlling the discharge of liquid through said openings, said shutter valve having an opening extended completely from the top to the bottom and into the top of which said cam extends for shifting said shutter valve as said shaft is turned, whereby said wall and shutter valve may be removed from said hollow body as a unit to expose the interior of said hollow body, a member mounted on said shutter for blocking off certain of said perforations and means for moving said member relatively on said shutter, comprising fingers mounted on said member and engageable with diametrically opposite sides of said body, and springs mounted on said shutter valve and normally restraining said shutter valve from moving to extreme positions in which said fingers engage said body, and whereby when said shutter valve is moved to said extreme positions said springs will be compressed and said fingers will strike said hollow body causing the member to move relative to the shutter valve.

BERNARD LOWENTHAL.
EDNA LOWENTHAL.